(12) United States Patent
Kuo (10) Patent No.: US 7,272,680 B2
(45) Date of Patent: Sep. 18, 2007

(54) METHOD OF TRANSFERRING DATA BETWEEN COMPUTER PERIPHERALS

(75) Inventor: Chien-Cheng Kuo, Taoyuan (TW)

(73) Assignee: Nvidia Corporation, Santa Clara, CA (US)

( * ) Notice: Subject to any disclaimer, the term of this patent is extended or adjusted under 35 U.S.C. 154(b) by 241 days.

(21) Appl. No.: 11/074,627

(22) Filed: Mar. 9, 2005

(65) Prior Publication Data

US 2006/0129734 A1    Jun. 15, 2006

(30) Foreign Application Priority Data

Oct. 12, 2004    (TW) ............................... 93130802 A (51) Int. Cl.
  *G06F 13/00* (2006.01)
  *G06F 13/36* (2006.01)
  *G06F 7/00* (2006.01)
(52) U.S. Cl. ..................... 710/308; 710/22; 710/52
(58) Field of Classification Search ................ 710/308, 710/72, 20–22, 1, 3, 33, 52; 370/400, 389, 370/351, 252, 464, 912; 709/212, 250, 219, 709/201, 232, 238, 253; 340/825.52
See application file for complete search history.

(56) References Cited

U.S. PATENT DOCUMENTS

| 4,266,222 | A | * | 5/1981 | Eckert et al. ............... 340/679 |
| 4,484,326 | A | * | 11/1984 | Turner ........................ 370/253 |
| 5,828,836 | A | * | 10/1998 | Westwick et al. ........... 709/200 |
| 5,884,093 | A | * | 3/1999 | Berenguel et al. ............. 710/1 |
| 6,744,771 | B1 | * | 6/2004 | Barber et al. ............... 370/400 |
| 6,944,682 | B2 | * | 9/2005 | Tanaka ........................ 710/22 |
| 2002/0184394 | A1 | * | 12/2002 | Athanas et al. ............. 709/250 |
| 2003/0095590 | A1 | * | 5/2003 | Fuller et al. ................ 375/148 |
| 2004/0133718 | A1 | * | 7/2004 | Kodama et al. .............. 710/74 |

OTHER PUBLICATIONS

New data acquistion system for the fiocal plane polarimeter of theGrand Raiden spectrometer by Tamil et al. (abstract only)☐☐Publication Date: Oct. 1996.*

* cited by examiner

*Primary Examiner*—Gopal C. Ray
(74) *Attorney, Agent, or Firm*—Patterson & Sheridan, LLP (57) ABSTRACT

An improved method for accessing data is disclosed, which is capable of increasing the efficiency of data access by reducing the time consumed by registering data in the system memory while transferring data between computer peripherals.

20 Claims, 6 Drawing Sheets

METHOD OF TRANSFERRING DATA BETWEEN COMPUTER PERIPHERALS

FIELD OF THE INVENTION

The present invention relates to a method for accessing data, and more particularly, to a method of direct data access between host controllers.

BACKGROUND OF THE INVENTION

Up until now, most data transferring between computer peripherals are completed through the communication between host bridges and host controllers, which are initialized and controlled by central processing units (CPUs) or micro controller units (MCUs). However, the conventional means adopted for transferring data not only causes the CPU/MCU to have a comparatively higher loading, but also might slow down the performance of the data accessing between computer peripherals.

Figure 1:
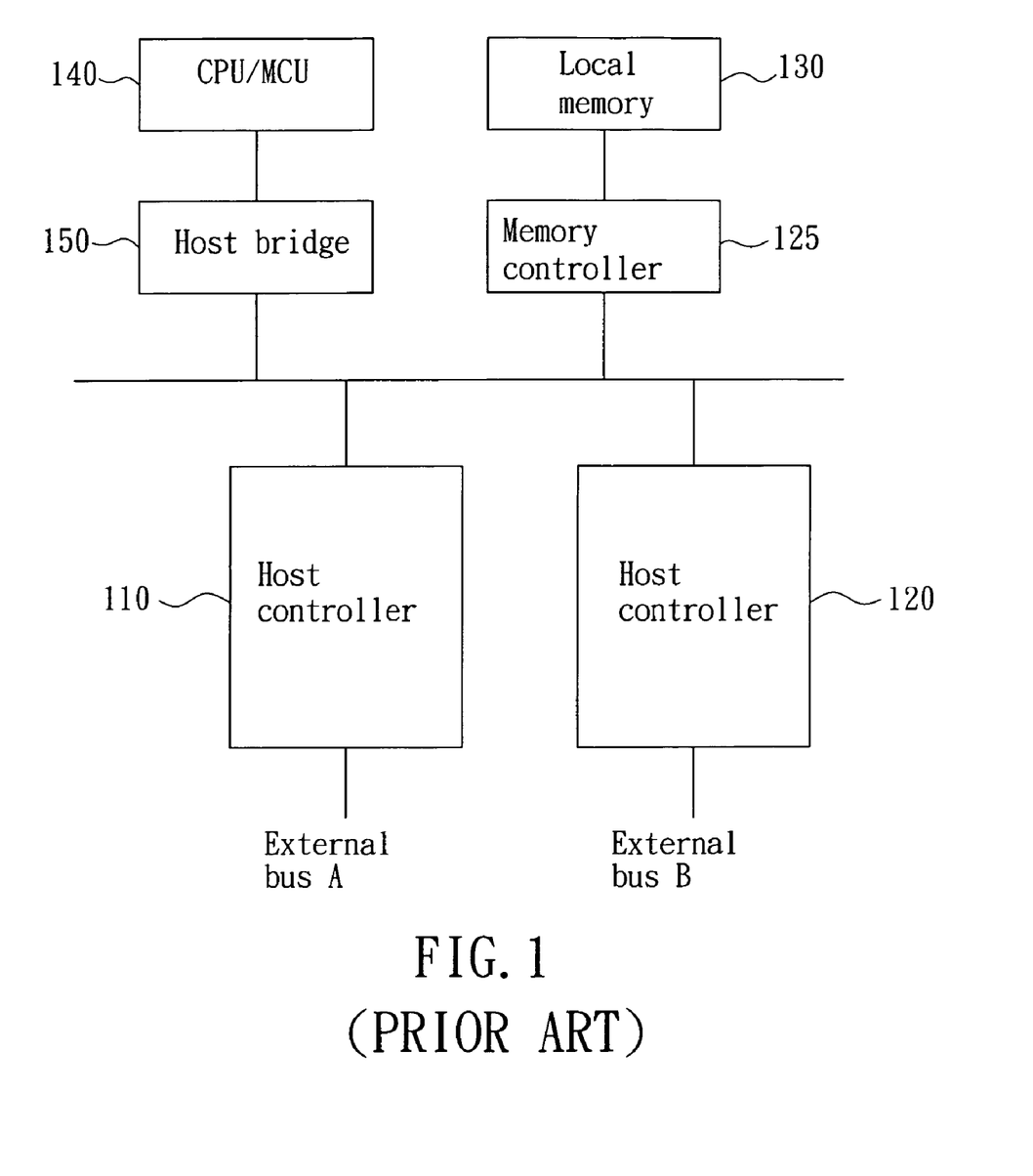
FIG. 1 is a conceptual system view of prior arts.

Please refer to FIG. 1, which is a conceptual system view of prior arts. As seen in FIG. 1, both the host controllers 110, 120 are capable of directly memory access (DMA), that is, if there are data must be transfer from one external bus A to another external bus B, the host controller 110 will first move data from the corresponding external buses A to a local system memory 130 by way of a memory controller 125, and then the host controller 120 will be able to access the data registered in the local system memory 130 and transferring the same to the external bus B.

From the above description, since a host controller with DMA can move data between external bus and local system memory by itself, the CPU 140 only need to initialize host controllers 110, 120 and prepares some instructions for the same, and then the host controllers 110, 120 can starts to transfer data. When either the host controller 110 or the host controller 120 finishes all its scheduled jobs, it can inform the CPU 140 and wait for next jobs. By virtue of this, the loading of the CPU 140 can be reduced since the host controllers 110, 120 with DMA capability are able to access the local system memory 130 directly and by its own.

However, while there are data to be transfer from the external bus A to the external bus B using the system seen in FIG. 1, the CPU 140 must employ the host bridge 150 to prepare schedule for the host controller 110 of bus A to move data from bus A to a space in the local system memory 130 by way of the memory controller 125, and then the CPU 140 must also employ the host bridge 150 to prepare another schedule for the host controller 120 of bus B to move data from such space in the local system memory 130 to the bus B also by way of the memory controller 125.

Hence, it is noted that the above means of data transferring will waste some time to transfer data to and from the local system memory 130. Moreover, if the local system memory 130 is very busy, then the performance of the system including the CPU 140, the host bridge 150, the host controllers 110, 120, the memory 130, and the memory controller 125 as well as the peripherals coupled to the same will be slow down.

In view of the above description, an improved method for accessing data is disclosed, which is capable of increasing the efficiency of data access by reducing the time consumed by registering data in the system memory while transferring data between computer peripherals.

SUMMARY OF THE INVENTION

It is the primary object of the invention to provide a method for accessing data capable of transferring data between computer peripherals without registering such data in a system memory. In order to achieve the foregoing object, the present invention provide a method for accessing data, characterized in that the data registered by a first host controller is transferred directly to a second host controller.

In a preferred embodiment of the invention, the operation of the method of the invention includes an initialize state, a programming state and a transfer state, which are described respectively hereinafter.

In the initialize state, a first host controller is initialized by way of using a CPU to program the operational registers of the first host controller so as to ensure the first host controller to work properly.

In the programming state, the CPU is used to set the data length, data type, begin/end address, state of the first host controller, and so on, while there are data required to be transferred between the first host controller and a second host controller.

In the transfer state, the transferring of data between the first host controller and the second host controller can be accomplished according to four cases, which are addressed as a case of single master write, a case of single master read, a case of two master write and a case of two master read, and are further described hereinafter.

In the case of single master write where data is transferred from the first host controller to the second host controller for illustration, the DMA function of the first host controller is enabled and the first host controller will issue a master cycle to read and confirm the transfer status of the second host controller for making an evaluation to determine whether the first host controller is able to actively transfer data to the second host controller.

In the case of single master read where data is transferred from the first host controller to the second host controller for illustration, the DMA function of the second host controller is enabled and the second host controller will issue a master cycle to read and confirm the transfer status of the first host controller for making an evaluation to determine whether the second host controller is able to actively access data from the first host controller.

In the case of two master write where data is transferred from the first host controller to the second host controller for illustration, both the DMA function of the first and the second host controllers are enabled simultaneously and the second host controller will issue a master cycle to inform the first host controller of its transfer status for making an evaluation to determine whether the first host controller is able to actively transfer data to the second host controller.

In the case of two master read where data is transferred from the first host controller to the second host controller for illustration, both the DMA function of the first and the second host controllers are enabled simultaneously and the first host controller will issue a master cycle to inform the second host controller of its transfer status for making an evaluation to determine whether the second host controller is able to actively access data from the first host controller.

Objectives, advantages and applications of the present invention will be made apparent by the following drawings, detailed description of the invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 2A:
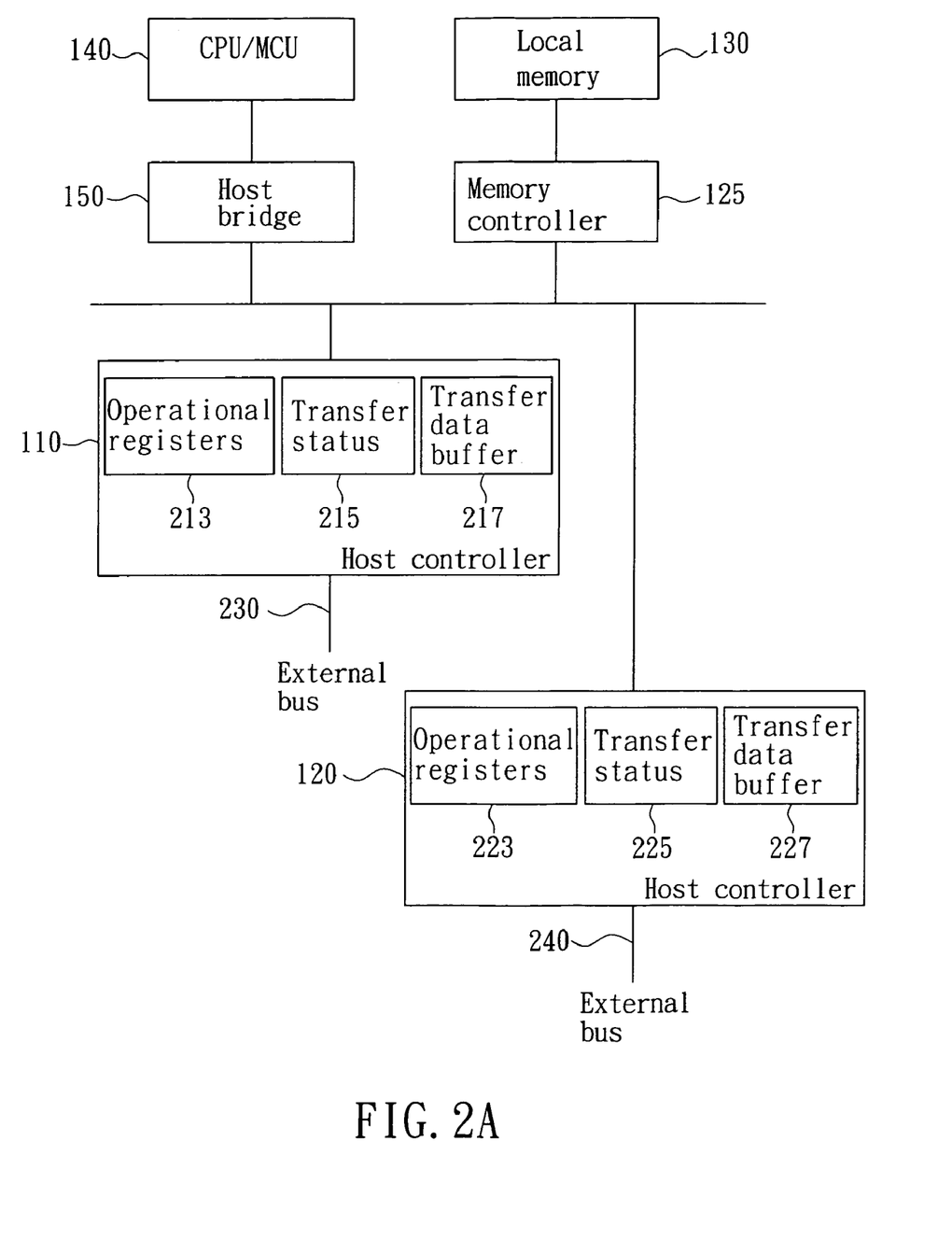
FIG. 2A is a schematic illustration depicting a method for accessing data according to the present invention.

Please refer to FIG. 2A, which is a schematic illustration depicting a method for accessing data according to the present invention. As seen in FIG. 2A, the method for accessing data enabling data to be transferred from a first host controller 110 to a second host controller 120 directly, and vice versa. That is, data inputted from an external bus 230 coupled to the first host controller 110 can be accessed and transferred directly to the external bus 240 coupled to the second host controller 120, and vice versa.

In a preferred embodiment of the invention, the operation of the method of the invention for accessing data between the first host controller 110 and the second host controller 120 can be divided into an initialize state, a programming state and a transfer state, which are described respectively hereinafter.

Figure 2B:
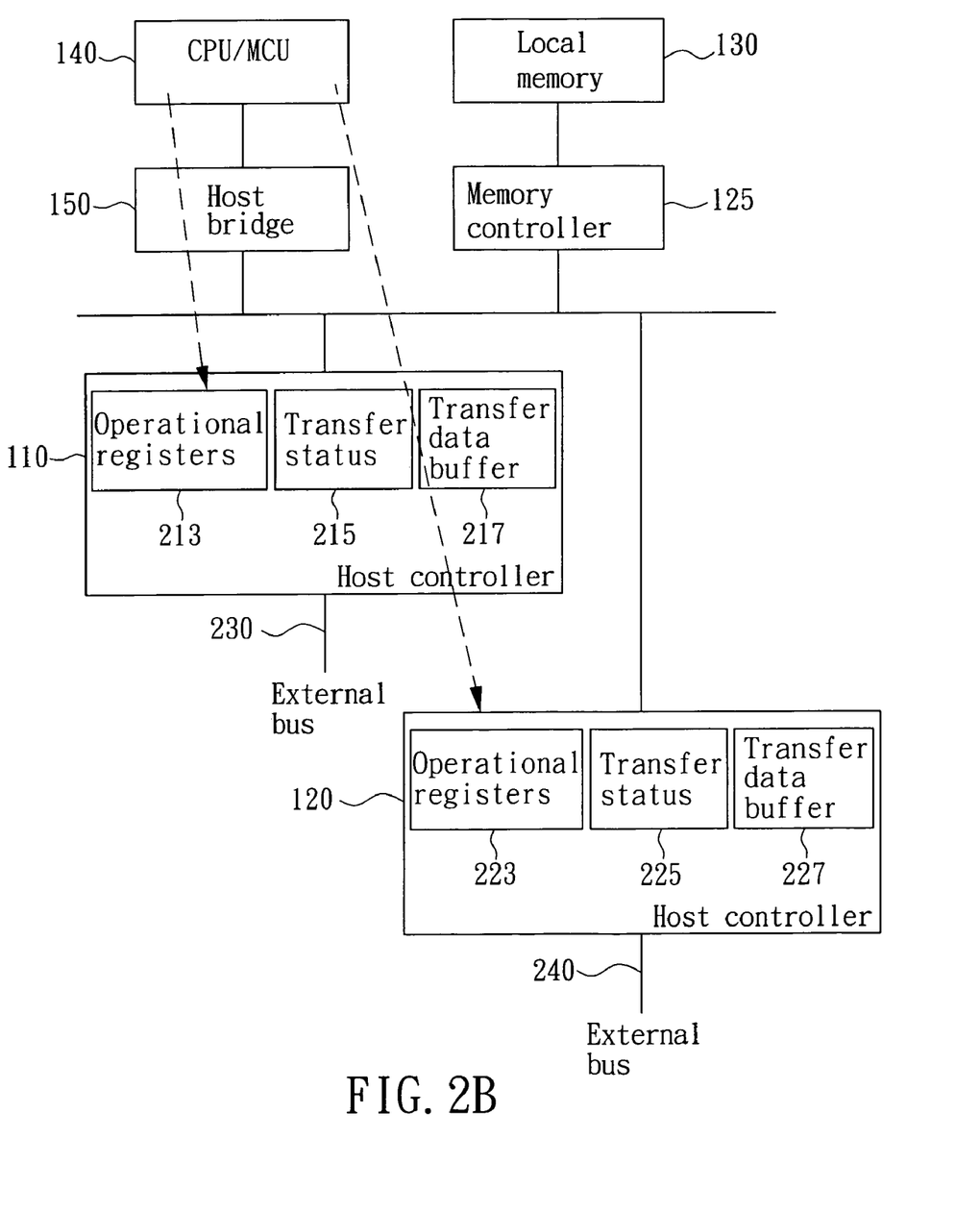
FIG. 2B is a schematic illustration depicting an initialize state of the method for accessing data according to the present invention.

Please refer to FIG. 2B, which is a schematic illustration depicting an initialize state of the method for accessing data according to the present invention. In the initialize state, a first host controller 110 is initialized by way of using a CPU 140 to program one of the operational registers 213 of the first host controller 110 so as to ensure the first host controller 110 to perform a normal operation, wherein the normal operation of the first host controller 110 includes activating the first host controller 110, suspending/resuming the working of the first host controller 110 and disabling part of the function of the first host controller 110. The CPU will issue a master cycle of a direct memory access (DMA) function to the operational register 213 for programming the operational register 213 to enable the DMA function.

Figure 2C:
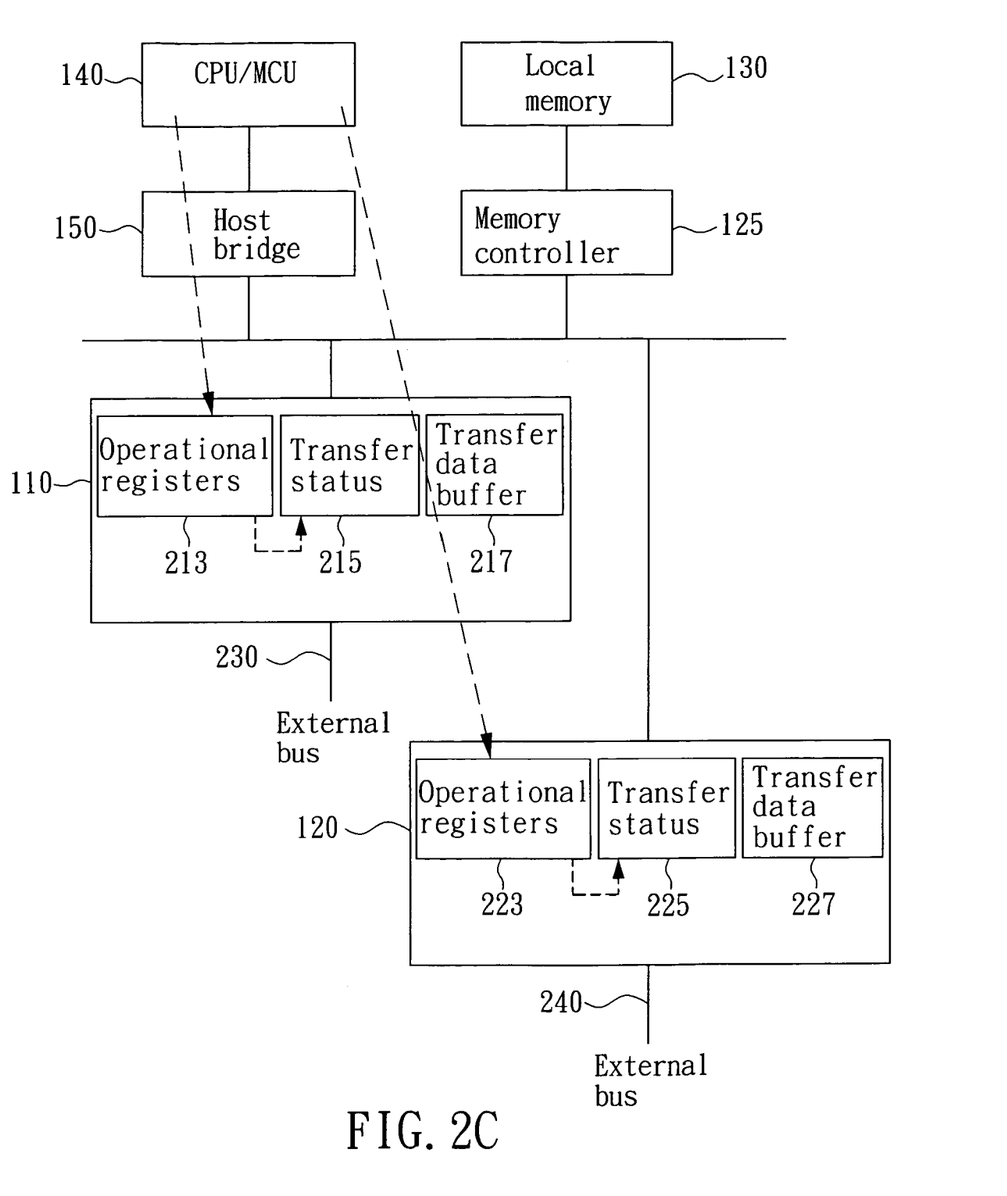
FIG. 2C is a schematic illustration depicting a programming state of the method for accessing data according to the present invention.

Please refer to FIG. 2C, which is a schematic illustration depicting a programming state of the method for accessing data according to the present invention. In the programming state as there are data to be transferred from the first host controller 110 to the second host controller 120, the CPU 140 is used to program the operational register 213 for setting the data length, data type, begin/end address, state of the first host controller, and so on, that is, for setting up a transfer status 215 of the first host controller 110 which is correspondence to the second host controller 120.

In a preferred embodiment of the invention, the transfer state of the method for accessing data between the first host controller 110 and the second host controller 120 can be accomplished according to four cases, which are addressed as a case of single master write, a case of single master read, a case of two master write and a case of two master read, and are further described hereinafter. Please refer to FIG. 2D, which is a schematic illustration depicting a case of single master write for the transfer state of the method for accessing data according to the present invention. In the case of single master write where data is transferred from the first host controller 110 to the second host controller 120 for illustration, the DMA function of the first host controller 110 is enabled and the first host controller 110 will issue a master cycle to read and confirm the transfer status 225 of the second host controller 120 for making an evaluation to determine whether the first host controller 110 is able to actively transfer data to the second host controller 120, wherein the transfer status 225 of the second host controller 120 includes buffer size of a transfer data buffer 227 of the second host controller 120, status of the transfer data buffer 227, buffer begin address of the transfer data buffer 227 and the likes.

Figure 2D:
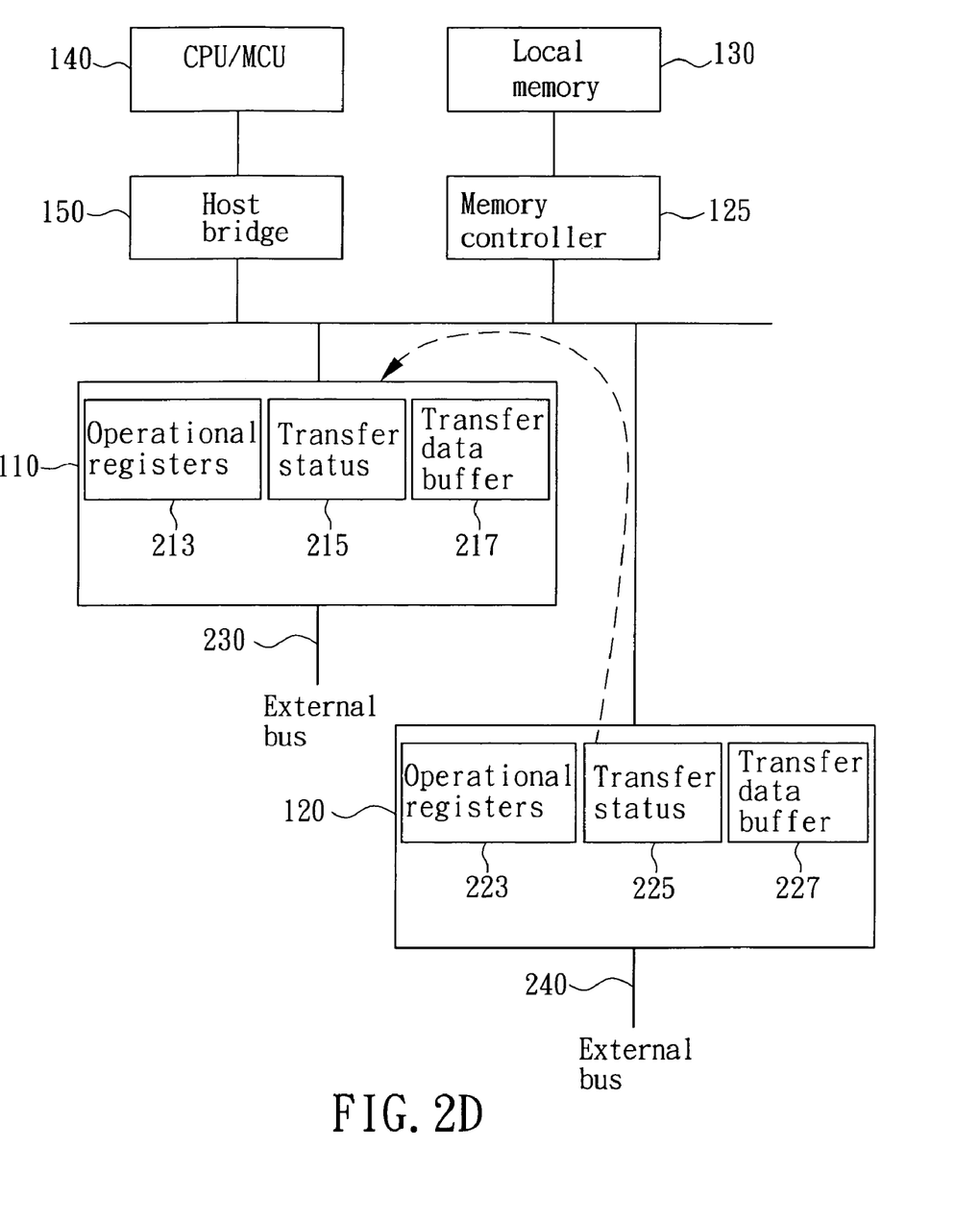
FIG. 2D is a schematic illustration depicting a case of single master write for the transfer state of the method for accessing data according to the present invention.

While the transfer status 225 of the second host controller 120 is defined as ready, the first host controller 110 will transfer the data obtained from a corresponding first external bus 230 and registered in a transfer data buffer 217 of the first host controller 110 to the transfer data buffer 227 of the second host controller 120. Thereafter, data registered in the transfer data buffer 227 of the second host controller 120 is moved to a second external bus 240 corresponding to the second host controller 120 for completing the data transferring.

Moreover, after the data transferring is completed, the transfer status 215 of the first host controller 110 and the transfer status 225 of the second host controller 120 are updated automatically while the transfer status 225 of the second host controller 120 can be updated according to the setting of the operational register 213 of the first host controller 110.

While the total data length is larger than the buffer size of the transfer data buffer 227 of the second host controller 120, the first host controller 110 is capable of selectively adapting a plurality of master write cycles for separating the data into a plurality of corresponding packets and moving the same form the first host controller 110 to the transfer data buffer 227 of the second host controller 120 separately. In addition, the data is being continuously transferred from the first host controller 110 to the second host controller 120 while a next data to be transferred is ready on the first external bus 230 corresponding to the first host controller 110.

When the transfer status 225 of the second host controller 120 is defined as not ready, the first host controller 110 will issuing a master cycle later to read and confirm the transfer status 225 of the second host controller 120 again.

Figure 2E:
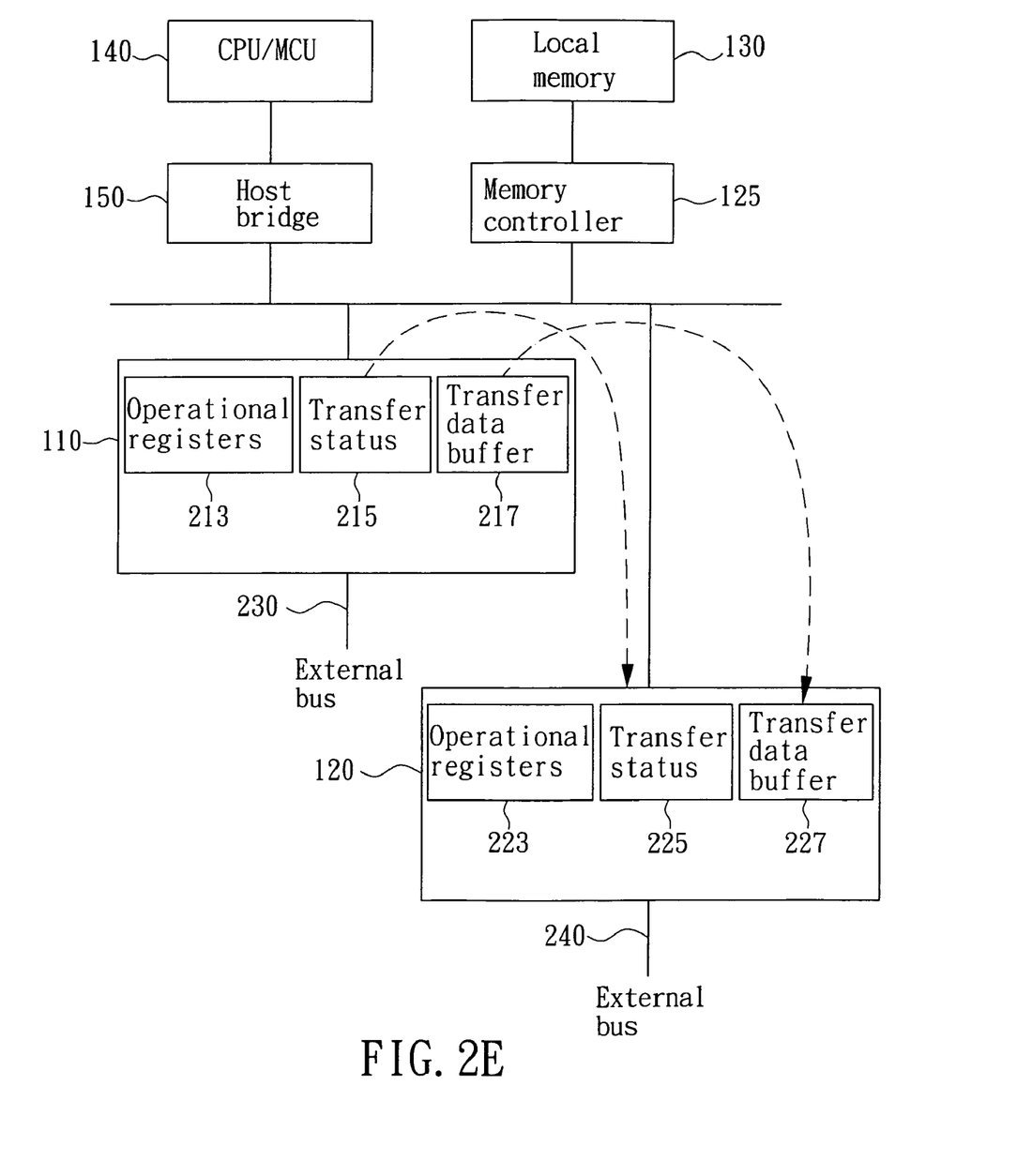
FIG. 2E is a schematic illustration depicting a case of single master read for the transfer state of the method for accessing data according to the present invention.

Please refer to FIG. 2E, which is a schematic illustration depicting a case of single master read for the transfer state of the method for accessing data according to the present invention. As the case of single master read shown in FIG. 2E, not only data can be transferred from the first host controller 110 to the second host controller, that is actively controlled by the first host controller 110, but also the data can be access from the first host controller 110, which is actively controller by the second host controller 120.

In the case of single master read where data is transferred from the first host controller to the second host controller for illustration, the DMA function of the second host controller 120 is enabled and than the CPU 140 controls the second host controller 120 to issue a master cycle so as to read and confirm the transfer status 215 of the first host controller 110 for making an evaluation to determine whether the second host controller 120 is able to actively access data from the first host controller 110.

When the transfer status 215 of the first host controller 110 is defined as ready and the buffer size of the transfer data buffer 227 of the second host controller 120 is larger than total data length, the second host controller 120 will be able to access the registered data of the first host. Similarly, the second host controller 120 is capable of selectively adapting a plurality of master write cycles for separating the data into a plurality of corresponding packets and accessing the data form the first host controller separately while the total data length is larger than the buffer size of the transfer data buffer 227 of the second host controller 120. Moreover, the second host controller 120 can access data continuously from the first host controller 110 while there are still buffers available in the transfer data buffer 227 of the second host controller 120.

When the transfer status 215 of the first host controller 110 is defined as not ready, the second host controller 120 will issuing a master cycle later to read and confirm the transfer status 215 of the first host controller 110 again.

Moreover, after the data transferring is completed, the transfer status 215 of the first host controller 110 and the transfer status 225 of the second host controller 120 are updated automatically while the transfer status 215 of the first host controller 110 can be updated according to the setting of the operational register 223 of the second host controller 120.

Further, in the case of two master write where data is transferred from the first host controller 110 to the second host controller 120 for illustration, both the DMA function of the first and the second host controllers 110, 120 are enabled simultaneously and the second host controller 120 will issue a master cycle to inform the first host controller 110 of its transfer status 225 for making an evaluation to determine whether the first host controller 110 is able to actively transfer data to the second host controller 120.

In the case of two master read where data is transferred from the first host controller 110 to the second host controller 120 for illustration, both the DMA function of the first and the second host controllers 110, 120 are enabled simultaneously and the first host controller 110 will issue a master cycle to inform the second host controller 120 of its transfer status 215 for making an evaluation to determine whether the second host controller 120 is able to actively access data from the first host controller 110.

Since the data being transferred between the first host controller 110 and the second host controller 120 is being performed directly, it is possible to perform the data transferring using a case of mixing the case of master read and master write, i.e. a case of mixing read and write. In the case of mixing read and write, both the DMA function of the first and the second host controllers 110, 120 are enabled simultaneously for performing an operation selected from the group consisting of accessing data actively by the destination thereof from the origin thereof and transferring data actively by the origin thereof to the destination thereof, while the transferring of data is being performed between the first host controller 110 and the second host controller 120.

To sum up, the present invention provides an improved method for accessing data, which is capable of increasing the efficiency of data access by reducing the time consumed by registering data in the system memory while transferring data between computer peripherals.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for accessing data, comprising the step of:
   transferring data registered by a first host controller to a second host controller directly,
   wherein the transferring further comprises an initialize state, a programming state, and a transfer state, and wherein the CPU is being used to program an operational register of the first host controller for setting the data length, data type, begin/end address, and state of the first host controller while there are data required to be transferred from the first host controller to the second host controller as the transferring is in the programming state.

2. The method of claim 1 wherein the first host controller is initialized by way of using a central processing unit (CPU) to program one of a plurality of operational registers of the first host controller to ensure a normal operation of the first host controller while the transferring is in the initialize state.

3. The method of claim 1 wherein the normal operation of the first host controller includes activating the first host controller, suspending/resuming the working of the first host controller and disabling part of the function of the first host controller.

4. The method of claim 1, wherein the first host controller sets a transfer status thereof corresponding to the second host controller with respect to the setting of the operational register.

5. The method of claim 1, wherein the CPU issues a master cycle of a direct memory access (DMA) function to the operational register for programming the DMA function.

6. A method for accessing data, comprising the step of:
   transferring data registered by a first host controller to a second host controller directly,
   wherein the transferring further comprises an initialize state, a programming state, and a transfer state, and wherein the transferring of data between the first host controller and the second host controller as the transferring is in the transfer state can be accomplished according to four cases addressed as following a case of single master write, a case of single master read, a case of two master write and a case of two master read.

7. The method of claim 6, further comprising the step of:
   enabling the DMA function of the first host controller and issuing a master cycle by the first host controller to read and confirm a transfer status of the second host controller for making an evaluation to determine whether the first host controller is able to actively transfer data to the second host controller, while the transferring of data from the first host controller to the second host controller as the transferring is in the transfer state is being accomplished by the case of single master write.

8. The method of claim 7, wherein the transfer status of the second host controller includes buffer size of a transfer data buffer of the second host controller, status of the transfer data buffer, and buffer begin address of the transfer data buffer.

9. The method of claim 7, further comprising the steps of:
   using the first host controller to transfer the data obtained from a corresponding first external bus to the transfer data buffer of the second host controller while the transfer status of the second host controller is defined as ready;

moving data from the transfer data buffer of the second host controller to a second external bus corresponding to the second host controller for completing the data transferring after the data is being received by the second host controller; and updating the transfer status of the first host controller and the transfer status of the second host controller automatically while the transfer status of the second host controller can be updated according to the setting of the operational register of the first host controller, after the data transferring is completed.

10. The method of claim 7, further comprising the step of:

controlling by the first host controller for selectively adapting a plurality of master write cycles for separating the data into a plurality of corresponding packets and moving the same form the first host controller to the second host controller separately while the total data length is larger than the buffer size of the transfer data buffer of the second host controller.

11. The method of claim 10, wherein the data is being continuously transferred from the first host controller to the second host controller while a next data to be transferred is ready on the first external bus corresponding to the first host controller.

12. The method of claim 7, further comprising the step of:

issuing a master cycle by the first host controller to read and confirm the transfer status of the second host controller again while the transfer status of the transfer data buffer of the second host controller is defined as not ready.

13. The method of claim 6, further comprising the step of:

enabling the DMA function of the second host controller and issuing a master cycle by the second host controller to read and confirm a transfer status of the first host controller for making an evaluation to determine whether the second host controller is able to actively access data from the first host controller, while the transferring of data from the first host controller to the second host controller as the transferring is in the transfer state is being accomplished by the case of single master read.

14. The method of claim 13, further comprising the steps of:

accessing the registered data of the first host controller by the second host controller while the transfer status of the first host controller is defined as ready and the buffer size of the transfer data buffer of the second host controller is larger than total data length; and controlling by the second host controller for selectively adapting a plurality of master write cycles for separating the data into a plurality of corresponding packets and accessing the data from the first host controller separately while the total data length is larger than the buffer size of the transfer data buffer of the second host controller.

15. The method of claim 13, further comprising the steps of:

issuing a master cycle by the second host controller to read and confirm the transfer status of the first host controller again while the transfer status of the first host controller is defined as not ready; and updating the transfer status of the first host controller and the transfer status of the second host controller automatically while the transfer status of the first host controller can be updated according to the setting of the operational register of the second host controller, after the data accessing is completed.

16. The method of claim 6, further comprising the step of:

enabling both the DMA function of the first and the second host controllers simultaneously and issuing a master cycle by the second host controller to inform the first host controller of its transfer status for making an evaluation to determine whether the first host controller is able to actively transfer data to the second host controller, while the transferring of data from the first host controller to the second host controller as the transferring is in the transfer state is being accomplished by the case of two master write.

17. The method of claim 6, further comprising the step of:

enabling both the DMA function of the first and the second host controllers simultaneously and issuing a master cycle by the first host controller to inform the second host controller of its transfer status for making an evaluation to determine whether the second host controller is able to actively access data from the first host controller, while the transferring of data from the first host controller to the second host controller as the transferring is in the transfer state is being accomplished by the case of two master read.

18. The method of claim 6, further comprising the step of:

enabling both the DMA function of the first and the second host controllers simultaneously and performing an operation selected from the group consisting of accessing data actively by the destination thereof from the origin thereof and transferring data actively by the origin thereof to the destination thereof, while the transferring of data is being performed between the first host controller and the second host controller and is being accomplished by a case of mixing read and write.

19. The method of claim 6, wherein the first host controller is initialized by way of using a central processing unit (CPU) to program one of a plurality of operational registers of the first host controller to ensure a normal operation of the first host controller while the transferring is in the initialize state.

20. The method of claim 6, wherein the normal operation of the first host controller includes activating the first host controller, suspending/resuming the working of the first host controller and disabling part of the function of the first host controller.

* * * * *

UNITED STATES PATENT AND TRADEMARK OFFICE
CERTIFICATE OF CORRECTION

PATENT NO. : 7,272,680 B2  
APPLICATION NO. : 11/074627  
DATED : September 18, 2007  
INVENTOR(S) : Chien-Cheng Kuo It is certified that error appears in the above-identified patent and that said Letters Patent is hereby corrected as shown below:

In Column 6, Lines 21, Claim 2 please replace "claim 1 wherein" with -- claim 1, wherein --.

In Column 6, Lines 26, Claim 2 please replace "claim 1 wherein" with -- claim 1, wherein --.

In Column 6, Lines 46, Claim 6 please replace "following a case" with -- following: a case --.

In Column 7, Lines 19, Claim 10 please replace "form" with -- from --.

Signed and Sealed this

Tenth Day of March, 2009

JOHN DOLL  
*Acting Director of the United States Patent and Trademark Office*